US005836462A

United States Patent [19]

Liljedahl

[11] Patent Number: 5,836,462

[45] Date of Patent: Nov. 17, 1998

[54] ADJUSTING MEANS

[76] Inventor: Gunnar Liljedahl, Pellvagen 4, Luleå, Sweden, S-975 93

[21] Appl. No.: 817,022

[22] PCT Filed: Oct. 16, 1995

[86] PCT No.: PCT/SE95/01201

§ 371 Date: Apr. 8, 1997

§ 102(e) Date: Apr. 8, 1997

[87] PCT Pub. No.: WO96/13456

PCT Pub. Date: May 9, 1996

[30] Foreign Application Priority Data

Oct. 31, 1994 [SE] Sweden .................................. 9403720

[51] Int. Cl.[6] ........................................................ B60P 1/10

[52] U.S. Cl. ........................... 212/260; 212/237; 254/7 R

[58] Field of Search ..................................... 212/303, 255, 212/237, 260, 901; 254/7 R, 7 B, 7 C, 99, 102, 103

[56] References Cited

U.S. PATENT DOCUMENTS 1,011,477 12/1911 Norton .................................... 212/260
1,090,248 3/1914 Toepfer .................................... 212/901
1,432,725 10/1922 Petersen .................................. 212/303
3,146,879 9/1964 Montagino ................................ 254/98
5,488,880 2/1996 Sartorio ................................... 254/103

FOREIGN PATENT DOCUMENTS 130460 7/1993 Denmark .
525430 4/1931 Germany ............................... 254/7 R

*Primary Examiner*—Thomas J. Brahan
*Attorney, Agent, or Firm*—Jacobson, Price, Holman & Stern, PLLC

[57] ABSTRACT

Adjusting device for a hoisting crane including a work spindle, which is given an axial travel within a cylinder by a relative movement between a screw and a cooperating groove following a driving device. The work spindle has a free end, which is connected to a lifting arm of the hoisting crane through a connector or the like. In order to make it possible to move the work spindle axially without help of the driving device in the case of an emergency, the connector includes a connection which is stiff in the axial direction of the work spindle, and which includes two parts which are rotatable in relation to each other against a certain friction resistance around an axis, which is concentric to the work spindle.

3 Claims, 1 Drawing Sheet

ADJUSTING MEANS

FIELD OF THE INVENTION

The invention relates to an arrangement at an adjusting means for a hoisting crane or the like, which adjusting means consists of a work spindle which is given an axial travel within a cylinder by means of a relative movement between a screw and a cooperating groove meshing driving means, said work spindle having a free end, which is connected to a lifting arm of the hoisting crane by means of a connector.

BACKGROUND OF THE INVENTION

An adjusting means of above mentioned kind is known, where the work spindle consists of a screw in the threads of which a groove following means meshes, which means moves in a circular path around the screw. If the screw is prevented from rotating, the screw will be displaced in one or the other of two directions depending on the rotating direction of the groove following means. The free end of the screw is normally fixed to a lifting arm whereby the lifting arm follows the travel of the screw in its axial direction. The screw will not rotate because it is fixed to the lifting arm. If however, the driving motor, which drives the groove following means, will be out of order or its supply of energy will be broken, it may be necessary to reset the lifting arm to its starting position without the driving motor working. This can however not be accomplished without the screw being possible to rotate freely.

SUMMARY OF THE INVENTION

The object of the invention is to provide an arrangement, which permits the work spindle to be rotated by hand but that the normal working operation is the same under normal conditions. The arrangement according to the invention is thus an arrangement to be used in an emergency in order to reset the hoisting crane to its starting position.

BRIEF DESCRIPTION OF THE DRAWING

A preferred embodiment invention will be described in the following with reference to the enclosed drawings.

FIG. 2 is partly a side view, partly a longitudinal section of the arrangement according to the invention.

DETAILED DESCRIPTION OF THE PREFERRED EMBODIMENTS

Figure 1:
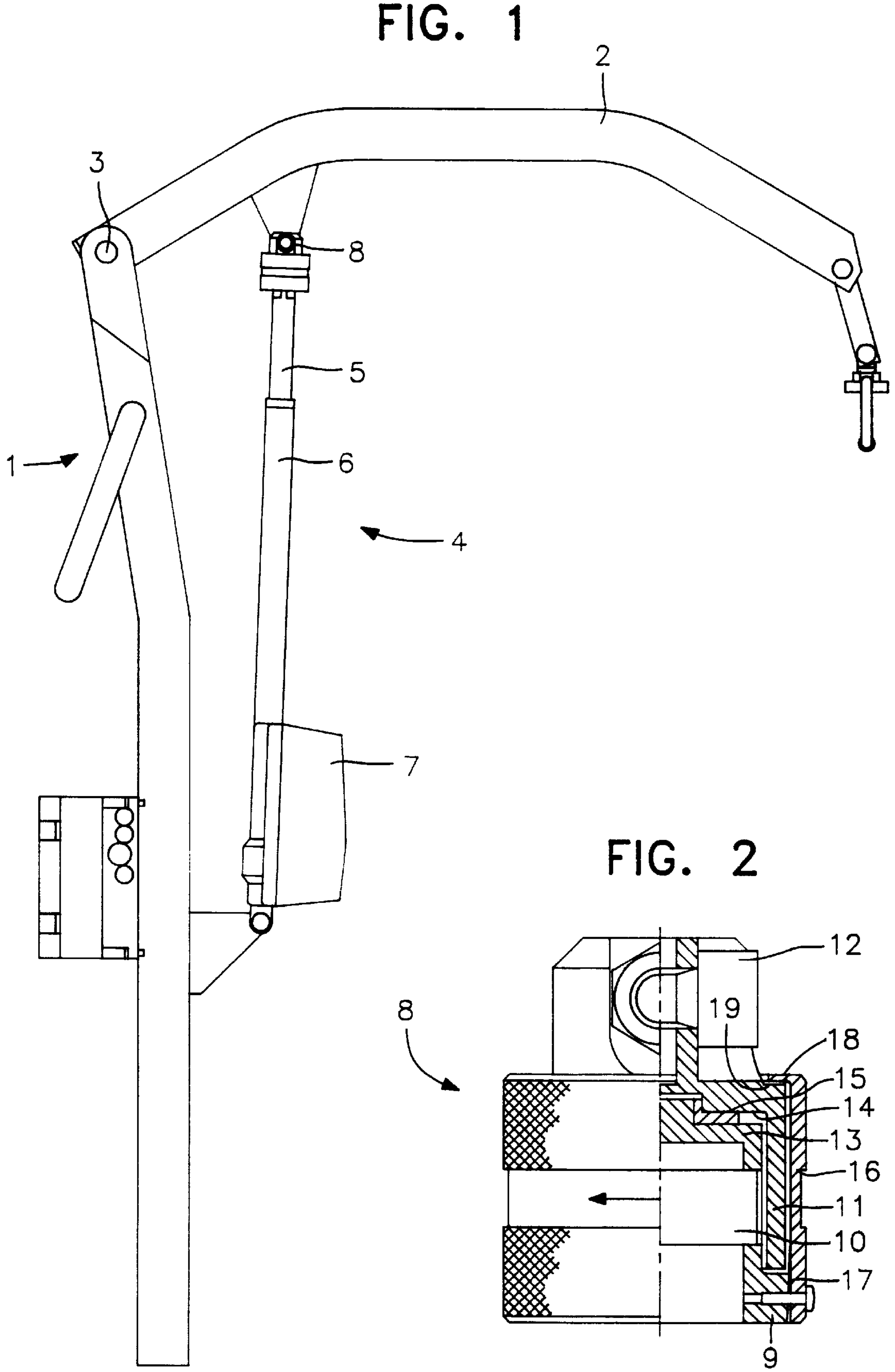
FIG. 1 is a side view of a hoisting crane including the adjusting means according to the invention.

In FIG. 1 a hoisting crane 1 is shown, which includes a lifting arm 2. The lifting arm can tilt up and down about a joint 3 by means of an adjusting means 4. The adjusting means includes a screw or work spindle 5, which can be moved backwards and forwards within a cylinder 6. The screw 5 meshes within the cylinder 6 by a groove following driving means, e.g. a ball, which is axially fixed and is forced to move in a circular path around the screw by means of a driving motor. This is known art and all the means are placed within a housing 7. When the groove following driving means is moved around the screw and the screw is prevented from rotating, the screw will travel upwards or downwards depending on the moving direction of the groove following driving means around the screw. Thus, according to the known art the work spindle or the screw is non-rotatable fixed to the lifting arm 2. The only possibility to reset the work spindle to its inserted position in the cylinder 6, if the driving motor should collapse or its supply of electricity should be broken, is to demount the work spindle from the lifting arm 2 and to turn the work spindle 5 (the screw) in such a direction that it will be screwed into the groove following driving means. When the hoisting crane according to this invention is used for hoisting or lifting handicapped persons, it is important that there is some form of possibility to reset the hoisting crane if in an emergency, without the work spindle to be demounted from the lifting arm. Therefore should be possible to rotate the work spindle by hand when in an emergency. This is now effected by the means shown in FIG. 2 and denoted by 8. This means is a connector between the free end of the work spindle 5 and the lifting arm 2.

The connector 8 includes a piston rod sleeve 3, which is pushed on to the work spindle 5 at its upper free end and is fixed to the spindle 5 against rotating in an axial direction by means of a pin 10. A mounting sleeve 11 is rotatably applied around the piston rod sleeve 9 and is thus rotatable in relation to the piston rod sleeve 9 but is fixed to the lifting arm 2 by means of a screw 12 and can thus not rotate in relation to the lifting arm 2. The screw 12 is inserted in a not shown eye on the lifting arm 2. The piston rod sleeve 9 has a sliding face 13 on its upper side and the mounting sleeve 11 has an opposite sliding face 13, the two sliding faces interacting. A bush 15 is placed between the two sliding faces 13, 14. The bush 15 and the sliding faces 13, 14 carry the thrust loads between the two sleeves. A turning sleeve 16 surrounds the two sleeves 9 and 11 in order to prevent these sleeves from being separated. The turning sleeve 11 is connected with the under part of the piston rod sleeve 9 by means of threads 17. The upper part of the turning sleeve 16 has a peripheral flange 18, which contacts a peripheral shoulder 19 on the mounting sleeve 11. This prevents the mounting sleeve 11 to be pulled apart from the piston rod sleeve 9. There is also a possibility to use the thread connection 17 for adapting the sliding friction between the bush and the sliding faces.

The connector according to the invention acts so that the friction between the piston rod sleeve 9 and the mounting sleeve 11 is not greater so that the work spindle can be rotated by hand if the driving motor for any reason should not be able to operate but that said friction is great enough to prevent the rotating of the work spindle 5 when the groove following driving means moves around the work spindle (screw). By rotating the work spindle it will be screwed into the cylinder 6. The lifting arm thereby be lowered if an emergency situation should occur.

I claim:

1. An adjusting means for a hoisting crane, said adjusting means comprising a hoisting spindle in the form of a screw traveling axially within a cylinder by means of a relative movement between said screw and a cooperating driven groove meshing rotating means, said screw having a free end connected to a lifting arm of the hoisting crane by means of a connector, said connector being stiff in an axial direction of the work spindle and including two parts in the form of two concentric, in relation to each other, rotatable bodies, one being non-rotatably attached to a free end of said screw, the second being non-rotatably attached to said lifting arm of the hoisting crane, said rotatable bodies each having a sliding face, said sliding faces being opposed to each other perpendicular to the axis of the work spindle, said sliding faces being pressed to contact each other by means of a holding means so that a friction resistance is established against relative turning of said bodies about an axis, which is concentric with the work spindle, said friction being great enough to prevent the rotation of said screw when said groove meshing rotating means moves around said screw but is less than friction caused by hand rotation of said screw if said groove meshing rotating means should not be operable.

2. Adjusting means according to claim 1, wherein said bodies of the connector consist of two concentric sleeves.

3. Adjusting means according to claim 1, wherein said holding means is a sleeve, which is connected with one of said bodies by means of threads and rotatably grasps said second body through a flange.

* * * * *